(12) United States Patent
Echizen et al.

(10) Patent No.: US 8,285,998 B2
(45) Date of Patent: Oct. 9, 2012

(54) DYNAMIC IMAGE CONTENT TAMPER DETECTING DEVICE AND SYSTEM

(75) Inventors: Isao Echizen, Kawasaki (JP); Takaaki Yamada, Kawasaki (JP); Nobuharu Miura, Tokyo (JP); Michiro Maeta, Tokyo (JP); Takashi Mizuno, Tokyo (JP)

(73) Assignee: Hitachi Government & Public Corporation System Engineering, Ltd., Tokyo (JP)

( * ) Notice: Subject to any disclaimer, the term of this patent is extended or adjusted under 35 U.S.C. 154(b) by 229 days.

(21) Appl. No.: 12/442,995

(22) PCT Filed: Sep. 28, 2007

(86) PCT No.: PCT/JP2007/069016
§ 371 (c)(1),
(2), (4) Date: Feb. 12, 2010

(87) PCT Pub. No.: WO2008/038783
PCT Pub. Date: Apr. 3, 2008

(65) Prior Publication Data
US 2010/0146282 A1 Jun. 10, 2010

(30) Foreign Application Priority Data
Sep. 29, 2006 (JP) .................................. 2006-268312

(51) Int. Cl.
*H04L 9/32* (2006.01)
(52) U.S. Cl. ............ 713/176; 713/194; 705/50; 705/76; 380/200; 380/201
(58) Field of Classification Search .................. 713/176, 713/194; 705/50, 76; 380/200, 201
See application file for complete search history.

(56) References Cited

U.S. PATENT DOCUMENTS

| | | | |
|---|---|---|---|
| 7,047,412 B2 | 5/2006 | Echizen et al. | |
| 7,120,251 B1 | 10/2006 | Kawada et al. | |
| 7,636,451 B2 * | 12/2009 | Isogai | 382/100 |
| 2004/0008923 A1 | 1/2004 | Anzai et al. | |
| 2004/0243820 A1 * | 12/2004 | Noridomi et al. | 713/194 |
| 2005/0084008 A1 | 4/2005 | Kato et al. | |
| 2007/0143617 A1 * | 6/2007 | Farber et al. | 713/176 |
| 2007/0192250 A1 * | 8/2007 | Nakamoto et al. | 705/50 |

FOREIGN PATENT DOCUMENTS

| | | |
|---|---|---|
| EP | 1 517 562 A2 | 3/2005 |
| JP | 2001-136161 | 5/2001 |
| JP | 2001-145055 | 5/2001 |
| JP | 2002-077807 | 3/2002 |
| JP | 2003-122726 | 4/2003 |
| JP | 2003-259314 | 9/2003 |
| JP | 2004-364263 | 12/2004 |
| JP | 2005-094550 | 4/2005 |
| JP | 2007-207051 | 8/2007 |

(Continued)

OTHER PUBLICATIONS

Security Protection of DICOM Medical Images Using Dual-Layer Reversible Watermarking with Tamper Detection Capability Chun Kiat Tan; Jason Changwei Ng; Xiaotian Xu; Chueh Loo Poh; Yong Liang Guan; Kenneth Sheah. Journal of Digital Imaging; New York (0897-1889) Jun. 2011. vol. 24,Iss.3;p. 528.*

(Continued)

*Primary Examiner* — Thanhnga B Truong
*Assistant Examiner* — Angela Holmes
(74) *Attorney, Agent, or Firm* — Antonelli, Terry, Stout & Kraus, LLP.

(57) ABSTRACT

Regularity information such as time codes embedded preliminarily through an electronic watermark is detected from a predetermined number of pieces of continuous frame data of video content through the electronic watermark. In the case where the electronic watermark is not detected from the predetermined number of pieces of continuous frame data, a non-detection count is calculated, and falsification of the predetermined number of pieces of frame data is determined on the basis of the detected regularity information and the non-detection count. Accordingly, falsification such as deletion, addition, and replacement of video content is detected with high accuracy using the electronic watermark.

11 Claims, 11 Drawing Sheets

OTHER PUBLICATIONS

Data hiding in digital video Cay, Abdullah. ProQuest Dissertations and Theses 2011. vol. 0544,Iss.0418;p. n/a.*

Tamper Detection in the EPC Network Using Digital Watermarking ShuiHua Han; Chao-Hsien Chu; Zongwei Luo. Security & Privacy, IEEE (1540-7993) 2011. vol. 9,Iss.5;p. 62-69.*

I. Echizen, et al., "General Quality Maintenance Module for Motion Picture Watermarking", IEEE Trans. Consumer Electronics, vol. 45, No. 4, pp. 1150-1158, 1999.

* cited by examiner

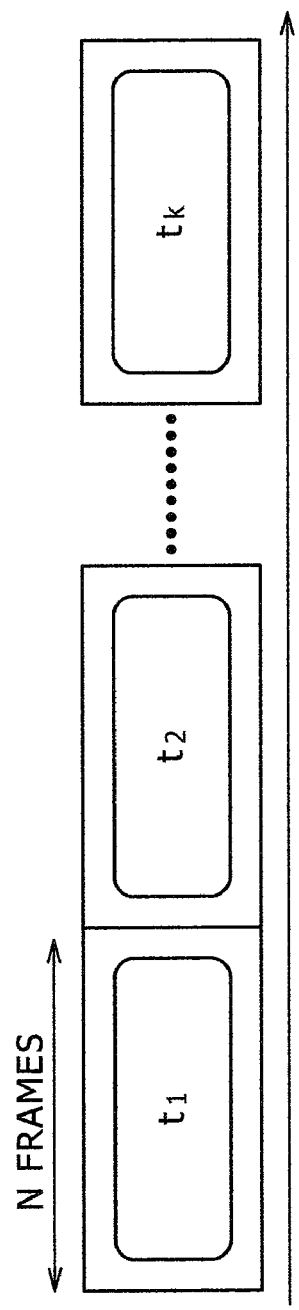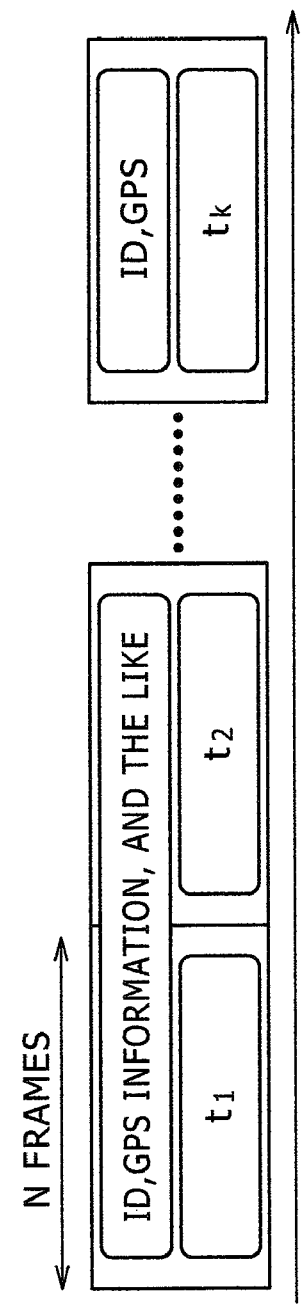

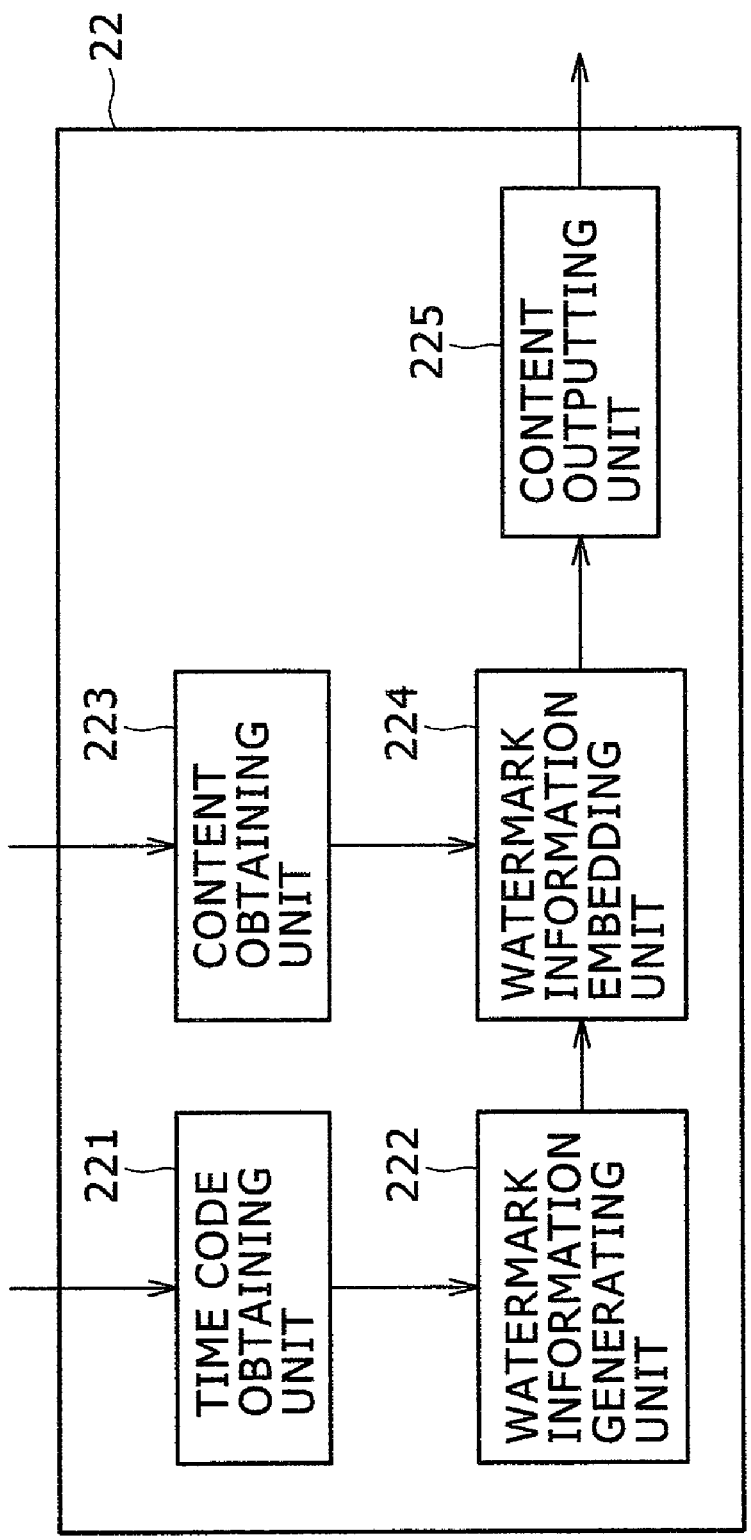

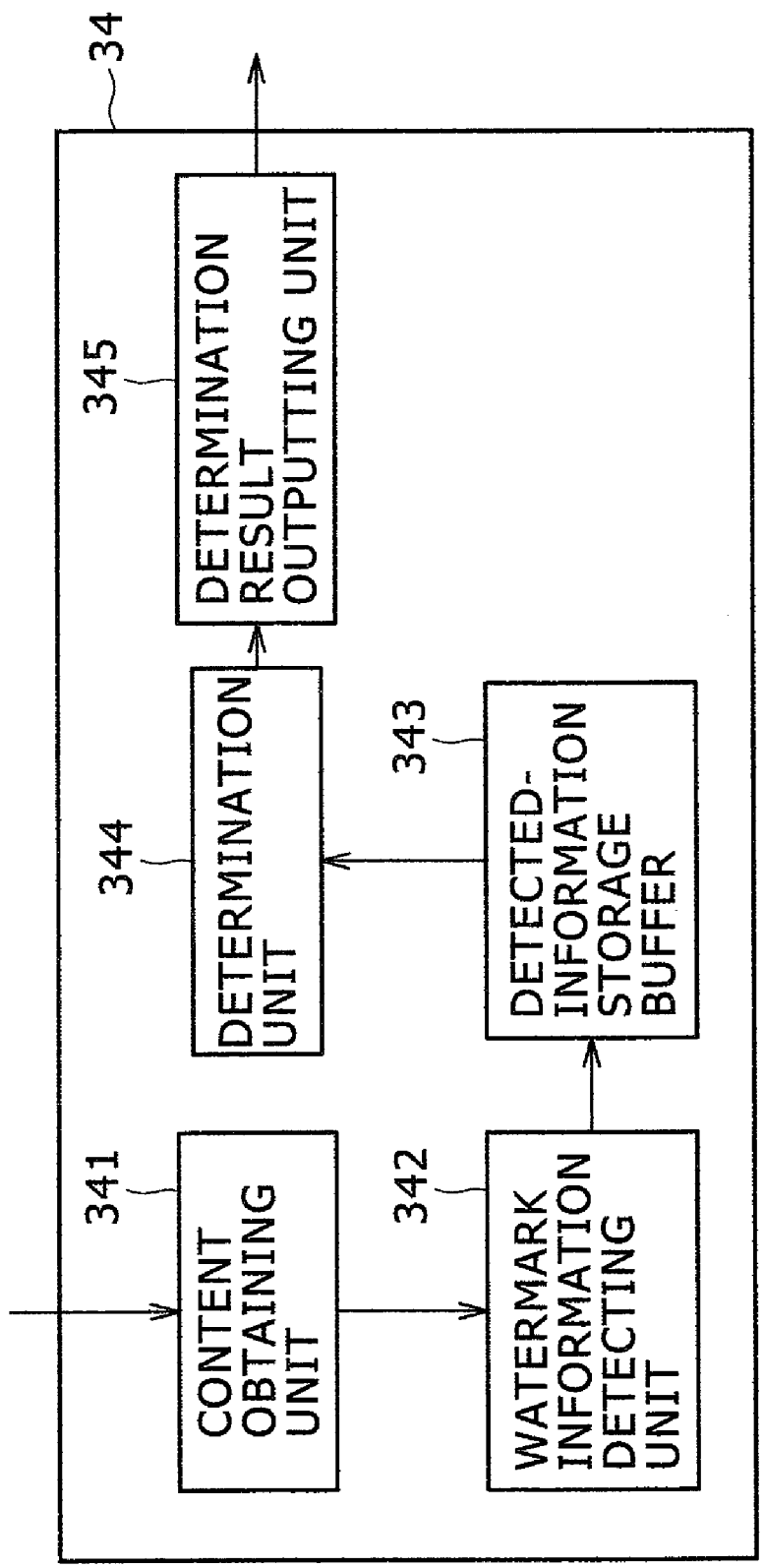

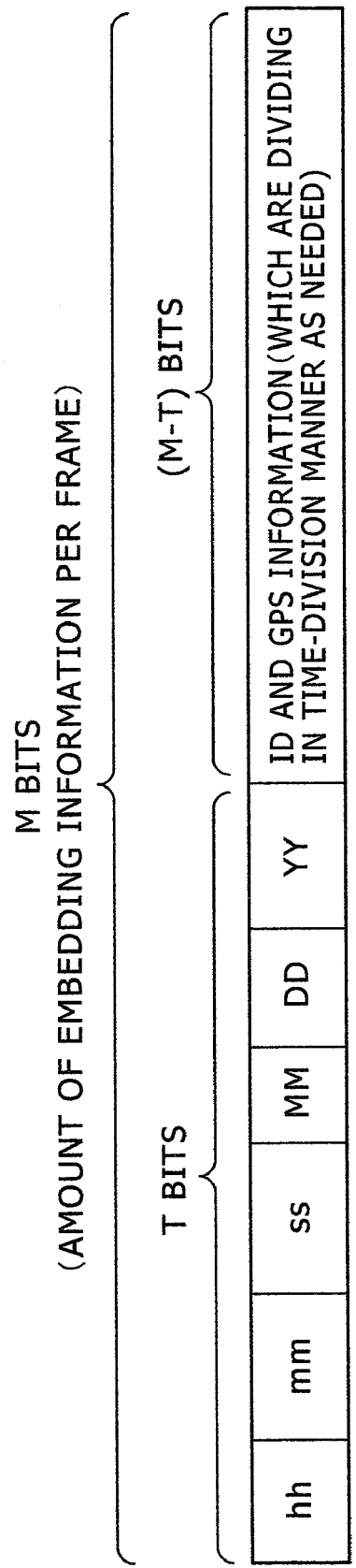

FIG. 10

| DIFFERENCE BETWEEN CARRENT TIME CODE AND PREVIOUS TIME CODE | WATERMARK NON-DETECTION COUNT |
|---|---|
| No attack | 0 OR UNIT TIME | 0,1 |
| Addition | 0 OR UNIT TIME | 2 OR LARGER |
| Deletion | 2 UNITS OF TIME OR LARGER | 0 |
| COMBINATION OF Addition AND deletion | OTHER THAN THE ABOVE | |

DYNAMIC IMAGE CONTENT TAMPER DETECTING DEVICE AND SYSTEM

BACKGROUND

1. Field of the Invention

The present invention relates to a falsification detecting apparatus and system of video content, and particularly to a detecting apparatus, a detecting method, and a detecting program of an electronic watermark, and an integrity verification system and a structure of video content, by all of which falsification such as deletion, addition, and replacement of digital video content is detected through an electronic watermark.

2. Description of the Related Art

Digital video content is occasionally used as evidential video in court. However, if the digital video content is stored over a long period of time, it is necessary to prove that the stored video content is not different from the original one because it is easily modified. As techniques for proving the authenticity of content, an electronic signature technique and an electronic watermarking technique have been put to practical use.

Preparation of electronic signatures involves time and efforts to make in some cases because data are needed to be transmitted and received to/from a certificate authority under the environment of enhanced security. On the other hand, as for an electronic watermark, if the authenticity of content is proven by using an electronic watermarking technique, watermark information can be embedded into the whole content in a dispersed manner. Accordingly, even if a coding scheme is converted, the embedded watermark information is hardly erased. Therefore, in the case where content is to be stored over a long period of time, a method of proving the authenticity using the electronic watermarking technique is preferable.

As for usage of the electronic watermarking technique, a technique for embedding information into content including video data and voice data through an electronic watermark is disclosed in the Patent Publication 1 and the Patent Publication 2.

In the Patent Publication 1, in order to automatically correct time difference of video and voice that are being broadcasted or used, the same time information is inserted into synchronized digital video and digital voice as an electronic watermark on the transmission side. In the meantime, the time information extracted from the digital video and the digital voice is compared to each other on the reception side, so that time difference of the video and voice is detected and corrected in accordance with the comparison result.

In addition, in the Patent Publication 2, a characteristic value obtained from header information of content is embedded into video data or voice data through an electronic watermark on the transmission side, and the watermark information embedded into the content is extracted on the reception side. In the case where the extracted watermark information does not match the header information, falsification of the content is detected.

[Patent Publication 1] JP Laid-Open No. 2003-259314
[Patent Publication 2] JP Laid-Open No. 2003-122726
[Non-Patent Publication]
"I. Echizen, H. Yoshiura, T. Arai, H. Kimura, T. Takeuchi: General Quality Maintenance Module for Motion Picture Watermarking, IEEE Trans. Consumer Electronics, Vol. 45, No. 4, pp. 1150-1158, (1999)"

SUMMARY OF THE INVENTION

Falsification of video content includes deletion, addition, and replacement of video data. For example, followings are concerns about falsification of video content that possibly occurs for the purpose of illegal acts: a part of video shooting public-works projects which are behind the construction schedule is replaced by video shooting another completed construction, or a part of video shooting a surgery is deleted to prevent a mistake in medical practice from being found out.

Thus, Patent Publication 1 is not originally a technique for detecting falsification of content, and does not suggest detection of falsification in the case where digital content is deleted, added, or replaced.

Further, in the Patent Publication 2, by comparing the characteristic value of the header embedded into the video data and the voice data with the header information of the content, falsification of the header information and replacement of the video data or the voice data can be detected. However, falsification in the case where data are partially deleted, added, or replaced can not be detected as similar to the Patent Publication 1.

An object of the present invention is to detect falsification such as deletion, addition, replacement of digital video content by using an electronic watermark.

Another object of the present invention is to manage digital video content while embedding regularity information thereinto as an electronic watermark, and to detect falsification of the digital video content later by detecting the regularity information.

In the present invention, content identification information and information with regularity, for example, time codes are repeatedly embedded, as an electronic watermark, into a set of predetermined number of continuous frame images, and falsification of video content is detected by detecting the regularity information.

According to a preferred example of the present invention, there is provided an electronic watermark detecting apparatus which detects an electronic watermark embedded into video content composed of plural pieces of frame data, and the apparatus includes: a detecting unit which detects information with regularity (referred to as regularity information) embedded preliminarily through the electronic watermark from a predetermined number of pieces of continuous frame data through the electronic watermark; a unit which calculates a non-detection count in the case where the electronic watermark is not detected from the predetermined number of pieces of continuous frame data; and a unit which determines falsification of the predetermined number of pieces of frame data on the basis of the detected regularity information and the non-detection count.

It is preferable that the detecting unit detects ordered sequential information or time codes, all of which are embedded as the regularity information.

Further, it is preferable that the regularity information is embedded into a first predetermined number of pieces of continuous frame data through the electronic watermark, additional information is further embedded into a second predetermined number of pieces of continuous frame data through the electronic watermark, and the detecting unit detects the regularity information and the additional information.

Furthermore, it is preferable that the detecting unit detects at least one of identification information, positional information, and right information of the video content, all of which are preliminarily embedded into the frame data as the additional information.

According to a preferred example of the present invention, there is provided an electronic watermark detecting method which detects an electronic watermark embedded into video content composed of plural pieces of frame data, and the method includes the steps of: detecting regularity information embedded preliminarily through the electronic watermark from a predetermined number of pieces of continuous frame data through the electronic watermark; calculating a non-detection count in the case where the electronic watermark is not detected from the predetermined number of pieces of continuous frame data; and determining falsification of the predetermined number of pieces of frame data on the basis of the detected regularity information and the non-detection count.

It is preferable that deletion, addition, or replacement of the video content is detected by detecting the electronic watermark including the regularity information.

Further, as an example: after a predetermined number N of obtained frames of video content are divided into sub-segments, each composed of continuous N/2 frames, detection windows are set to the sub-segments to detect the electronic watermark, and it is determined whether or not the electronic watermark is detected from the detection window; in the case where the determination result shows that the electronic watermark is not detected, a watermark non-detection count nD is incremented only by 1, and then a reading position of the video content is set to another reading position of the adjacent sub-segment to proceed to a detection process in the next detection window; and in the case where the determination result shows that the electronic watermark is detected, the watermark non-detection count nD is set to 0, and the regularity information is updated.

According to a preferred example of the present invention, there is provided a computer-executable electronic watermark detecting program which detects an electronic watermark embedded into video content composed of plural pieces of frame data, and the program executes the steps of: detecting regularity information embedded preliminarily through the electronic watermark from a predetermined number of pieces of continuous frame data through the electronic watermark; calculating a non-detection count in the case where the electronic watermark is not detected from the predetermined number of pieces of continuous frame data; and determining falsification of the predetermined number of pieces of frame data on the basis of the detected regularity information and the non-detection count.

According to a preferred example of the present invention, there is provided an integrity verification system of video content which includes a content processing apparatus which processes video content; and a content verification apparatus which is coupled to the content processing apparatus through a network and detects falsification of the video content. The content processing apparatus includes a unit which obtains regularity information from outside or inside, and a unit which embeds the obtained regularity information into a predetermined number of pieces of continuous frame data of the video content through an electronic watermark, and the content verification apparatus includes a detecting unit which detects the regularity information from the predetermined number of pieces of continuous frame data of the video content through the electronic watermark, a unit which calculates a non-detection count in the case where the electronic watermark is not detected from the predetermined number of pieces of continuous frame data, and a unit which determines falsification of the predetermined number of pieces of frame data on the basis of the detected regularity information and the non-detection count.

It is preferable that the embedding unit embeds the regularity information into a first predetermined number of pieces of continuous frame data through the electronic watermark, and further embeds additional information into a second predetermined number of pieces of continuous frame data through the electronic watermark.

Further, it is preferable that the embedding unit embeds ordered sequential information or time codes as the regularity information, and the detecting unit detects the sequential information or the time codes.

Furthermore, it is preferable that the embedding unit embeds at least one of identification information, positional information, and right information of the video content as the additional information, and the detecting unit detects at least one of the identification information, the positional information, and the right information of the video content embedded as the additional information.

According to a preferred example of the present invention, there is provided a structure of video content into which an electronic watermark is embedded for verification of the video content. Ordered regularity information is embedded into a first predetermined number of pieces of continuous frame data of the video content through the electronic watermark, and additional information including at least one of identification information, positional information, and right information of the video content is further embedded into a second predetermined number of pieces of continuous frame data through the electronic watermark.

According to the present invention, it is possible to detect falsification of digital video content with high accuracy.

BRIEF DESCRIPTION OF THE DRAWINGS

FIGS. 2A and 2B are diagrams, each showing an example of embedding an electronic watermark into video content by an electronic watermark embedding apparatus;

FIG. 3 is a block diagram showing an example of a detailed functional configuration of the electronic watermark embedding apparatus;

FIG. 4 is a block diagram showing an example of a detailed functional configuration of an electronic watermark detecting apparatus;

FIG. 5 is an explanatory diagram showing a configuration example of embedding information by the electronic watermark embedding apparatus;

FIG. 10 is a diagram showing an example of an Attack determination reference which is referred to by the electronic watermark detecting apparatus.

DETAILED DESCRIPTION OF THE EMBODIMENT

Hereinafter, an embodiment of the present invention will be described with reference to the drawings.

Figure 1:
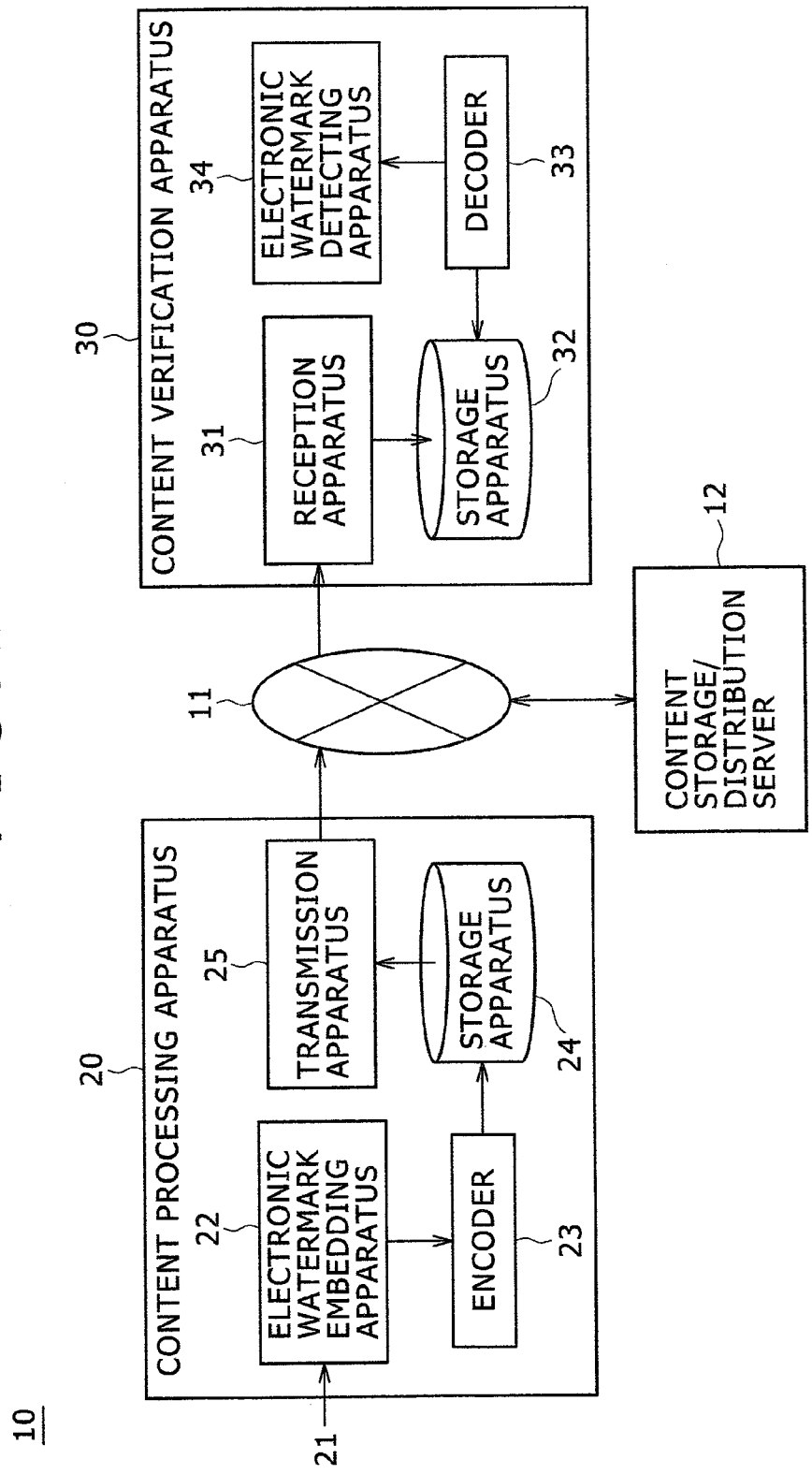
FIG. 1 is a diagram showing a configuration of a content distribution system according to an embodiment.

FIG. 1 is a diagram showing a configuration of a content distribution system 10 according to the embodiment. The content distribution system 10 is configured to include a content storage/distribution server 12, a content processing apparatus 20, and a content verification apparatus 30, all of which are coupled to a communication network 11. For example, the content processing apparatus 20 is owned by a content production company, and the content verification apparatus 30 is owned by a company showing content.

The content processing apparatus 20 includes an electronic watermark embedding apparatus 22, an encoder 23, a storage apparatus 24, and a transmission apparatus 25. Here, an encoding process of content by the encoder 23 is not always necessary, and an electronic watermark may be directly embedded into already-encoded content by the electronic watermark embedding apparatus 22.

In the content processing apparatus 20, digital video content obtained from a content generating source 21 such as a video device and a camera is input through the communication network 11, and the electronic watermark embedding apparatus 22 embeds an electronic watermark into the digital video content. The transmission apparatus 25 transmits the content with the electronic watermark embedded to the content storage/distribution server 12 through the communication network 11. It should be noted that the content generated by the content processing apparatus 20 may be transferred to the server 12 for accumulation through not the communication network 11 but media such as DVDs, a wireless network, or airwaves.

The content verification apparatus 30 includes a reception apparatus 31, a storage apparatus 32, a decoder 33, and an electronic watermark detecting apparatus 34. Here, a decoding process of content by the decoder 33 is not always necessary, and an electronic watermark may be directly detected from encoded content by the electronic watermark detecting apparatus 34.

The content verification apparatus 30 allows the reception apparatus 31 to receive the content with the electronic watermark embedded from the content storage/distribution server 12 or the content processing apparatus 20 through the communication network 11, and the content with the electronic watermark embedded is temporarily accumulated in the storage apparatus 32. It should be noted that the content may be transferred and received through not the communication network 11 but media such as DVDs, a wireless network, or airwaves.

The decoder 33 decodes the content accumulated in the storage apparatus 32, and the electronic watermark detecting apparatus 34 detects the electronic watermark from the decoded content to output the determination result.

Video content produced by the content processing apparatus 20 is structured as shown in, for example, FIGS. 2A and 2B. FIGS. 2A and 2B schematically show embedding of an electronic watermark into video content. As shown in FIG. 2A, the video content is divided into time-division segments, each composed of N frames (for example, 30 frames per second). Time codes t1 to tk which are different from each other are embedded into the respective segments, but the same time code is embedded into each unit of N frames configuring each segment. Here, the time code is, for example, time information composed of year/month/date/hour/minute/second. However, the time code is not necessarily the time information, but numbers indicating the order of the segments may be used. In general, any information may be used as long as it is ordered sequential information.

Further, in the example shown in FIG. 2B, additional information such as a content ID and GPS information is embedded, in addition to the time codes t1 to tk. Here, the additional information is, for example, an ID (device ID) unique to a video device or a camera, and GPS is positional information. The reason of embedding the device ID is to verify whether or not video content shot by another camera is added to the video content. Further, the reason of embedding the GPS is to verify whether or not video content shot at another site is added to the video content.

As an example shown in FIG. 5, M-bit embedding information includes T-bit (T is smaller than M) time information and remaining (M–T)-bit additional information.

It should be noted that the additional information is not necessarily embedded in segment units. The same information may be embedded over a plurality of segments, or pieces of information obtained by dividing the additional information in a time-division manner may be embedded over a plurality of segments.

FIG. 3 is a block diagram showing an example of a detailed functional configuration of the electronic watermark embedding apparatus 22. The electronic watermark embedding apparatus 22 includes a time code obtaining unit 221, a watermark information generating unit 222, a content obtaining unit 223, a watermark information embedding unit 224, and a content outputting unit 225. These functional units are realized by hardware or software.

Here, the time code obtaining unit 221 obtains the time codes from the content generating source such as a video device and a camera, and a time information transmitter provided inside or outside the apparatus.

The watermark information generating unit 222 generates embedding information using the time codes obtained from the time code obtaining unit 221. As shown in FIG. 5, the time information is assigned to the T-bit (T is smaller than M) information of the M-bit embedding information. The additional information such as an ID of the content generating source such as a video device and a camera, an ID of content itself, and GPS information is assigned to the remaining (M–T) bits as needed.

The content obtaining unit 223 obtains the video content output from the content generating source. The watermark information embedding unit 224 embeds the watermark information generated by the watermark information generating unit 222 into the video content obtained by the content obtaining unit 223 in accordance with the embedding structure shown in FIGS. 2A and 2B. The content outputting unit 225 outputs the video content with the watermark embedded, generated by the watermark information embedding unit 224, to the outside of the apparatus.

It should be noted that an example of a method of embedding watermark information into video data using an electronic watermark technique is described in detail in "I. Echizen, H. Yoshiura, T. Arai, H. Kimura, T. Takeuchi: General Quality Maintenance Module for Motion Picture Watermarking, IEEE Trans. Consumer Electronics, Vol. 45, No. 4, pp. 1150-1158, (1999)", and the detail thereof will not be described herein.

FIG. 4 is a block diagram showing an example of a detailed functional configuration of the electronic watermark detecting apparatus 34. The electronic watermark detecting apparatus 34 includes a content obtaining unit 341, a watermark information detecting unit 342, a detected-information storage buffer 343, a determination unit 344, and a determination result outputting unit 345.

The content obtaining unit 341 obtains the video content with the electronic watermark embedded from the content storage/distribution server 12 or the content processing apparatus 20 through the communication network 11.

The watermark information detecting unit 342 divides the obtained video content into segments each composed of N frames, and then detects the electronic watermark on a segment basis. The detected-information storage buffer 343 stores and updates the time codes as many as a plurality of continuous segments detected by the watermark information detecting unit 342, and the additional information such as an ID.

The determination unit 344 refers to the information stored in the detected-information storage buffer 343, and determines the consistency of information detected among a plurality of continuous segments. Specifically, the determination unit 344 determines presence or absence of falsification, such as deletion, addition, and replacement, of the video content. The determination result outputting unit 345 outputs the determination result determined by the determination unit 344 to the outside of the apparatus.

Figure 6:
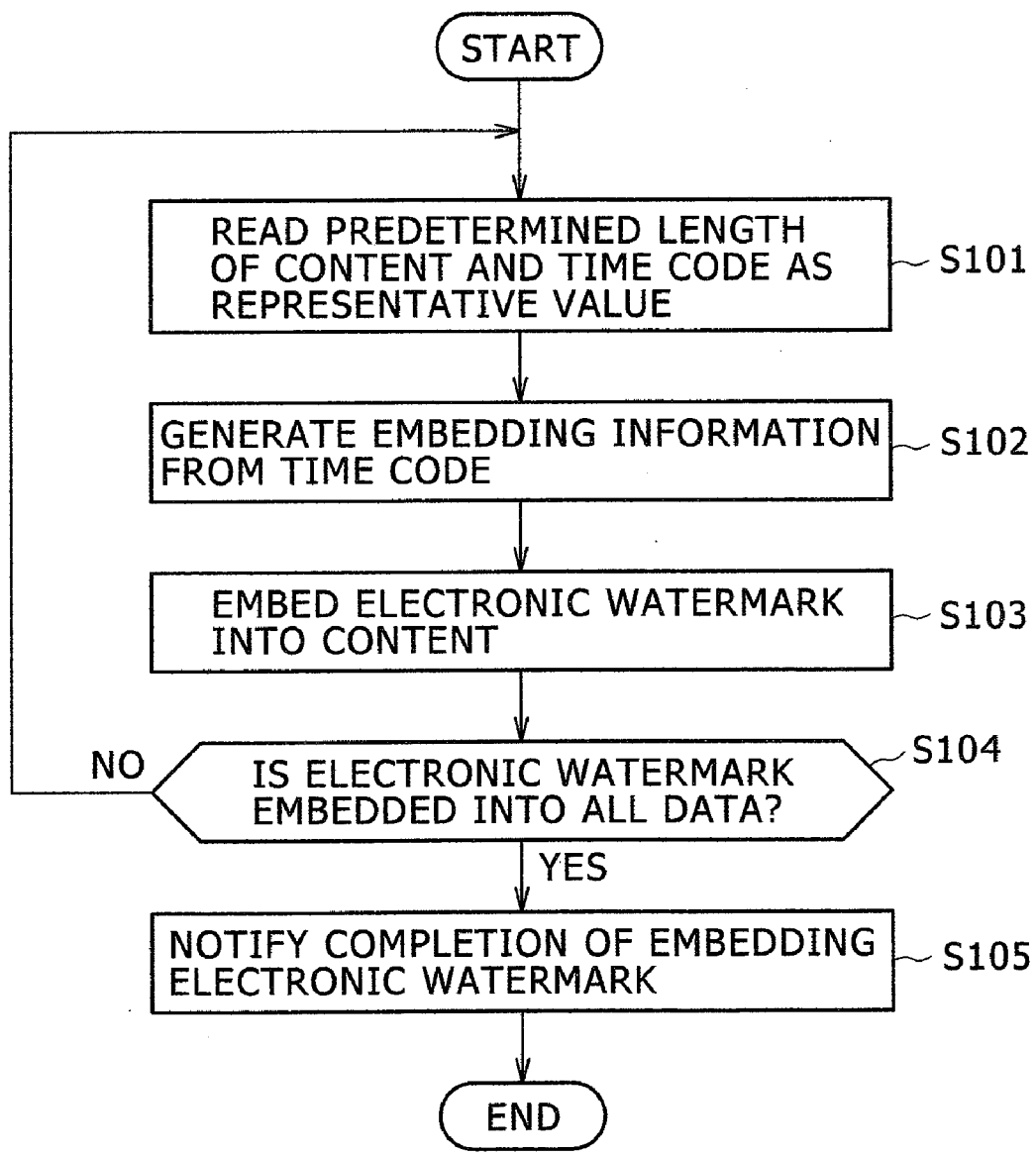
FIG. 6 is a flowchart showing an example of an electronic watermark embedding operation.

FIG. 6 is a flowchart showing an example of an operation of the electronic watermark embedding apparatus 22.

The electronic watermark embedding apparatus 22 starts the operation shown in the flowchart for the video content input from the content generating source 21.

First, the time code obtaining unit 221 obtains the time information serving as the time codes from the content generating source such as a video device and a camera, or from a transmitter of the time information provided inside or outside the apparatus, and temporarily stores the same into a storage area in the time code obtaining unit (S101). Further, the content obtaining unit 223 obtains the video content having a predetermined number of frames output from the content generating source, and temporarily stores the same likewise into a storage area in the time code obtaining unit 223.

Next, the watermark information generating unit 222 obtains the time information stored in the storage area in the time code obtaining unit 221, and generates the embedding information (S102). Then, the watermark information embedding unit 224 obtains a segment composed of continuous N frames from the video content that is temporarily stored in the storage area in the content obtaining unit 223, and embeds the watermark information generated by the watermark information generating unit 222 into the frame images of N frames, in accordance with the embedding structure shown in FIGS. 2A and 2B (S103).

Then, the content outputting unit 225 determines whether or not the watermark information is embedded into all of the segments of the video content (S104). If the determination result shows that the watermark information is not embedded into all of the segments of the video content, the time code obtaining unit 221 and the content obtaining unit 223 execute the process shown in S101 again.

On the other hand, if the determination result shows that the watermark information is embedded into all of the segments of the content data, the content outputting unit 225 notifies the encoder 24 of the completion of embedding the watermark information (S105). With this notification, the electronic watermark embedding apparatus 22 terminates the control operation shown in the flowchart.

It should be noted that in the case where the video is video content input in real time like one input from a camera, the determination may be performed by stopping the output process of the electronic watermark embedding apparatus 22.

Further, the processes in the respective steps may be realized by allowing a computer configuring the electronic watermark embedding apparatus 22 to execute programs that perform these processes.

Figure 7:
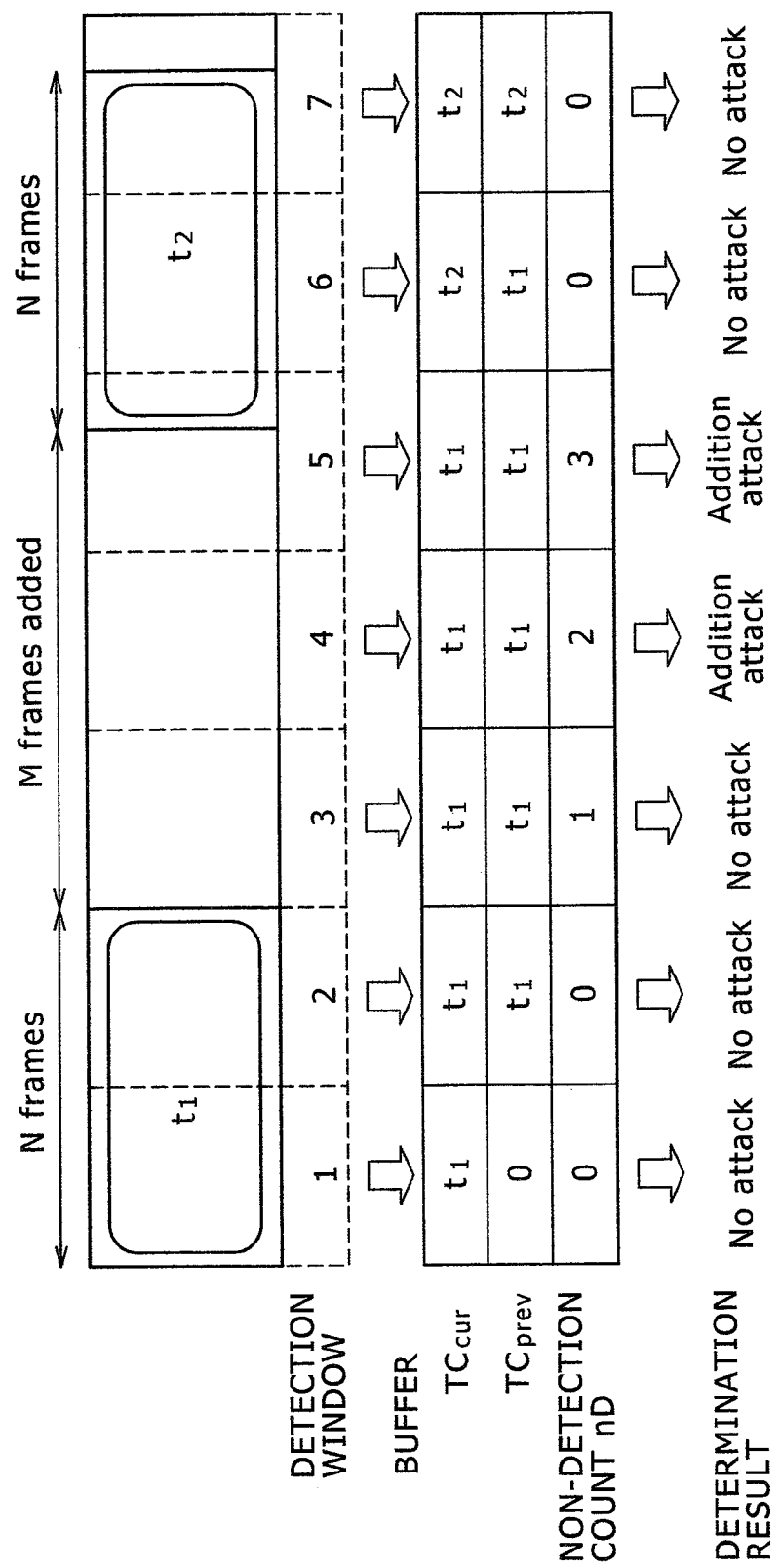
FIG. 7 is a diagram schematically showing a detection process of an electronic watermark when content is illegally added.

FIG. 7 schematically shows an example of a detection process of a watermark.

This example is an example in which another piece of video content composed of M frames is illegally inserted and added between a segment into which time code information t1 is embedded and another segment into which time code information t2 is embedded.

First, parameters in the detected-information storage buffer 343 are initialized. Specifically, time code information (TCcur) detected from a target detection window, time code information (TCpr) detected from the previous detection window of the target detection window, and a watermark non-detection count (nD) are all set to 0.

Next, after reading a predetermined number of frames, a detection window (detection window 1) is set to a first sub-segment among divided sub-segments, each composed of N/2 frames. In the watermark detection process, a frame accumulation process in which frames are added pixel-by-pixel is performed for the frame images of N/2 frames in the detection window, and then the watermark is detected from one added-watermark-image generated.

In the example shown in FIG. 7, the time code information t1 is embedded into the area of the detection window 1, and "t1" is accordingly detected as the time code information from the window. Thus, t1 is set to TCcur, and then the operation proceeds to a detection process for the next detection window (detection window 2).

As the time code information, "t1" is detected even in the detection window 2, so that after t1 is set to TCprev as the time code information detected from the detection window 1, the information "t1" detected from the detection window 2 that is the current detection window is set to TCcur (TCcur=t1), and then the operation proceeds to a detection process for the next detection window.

Since the watermark cannot be detected in a detection window 3, the time code is not updated. After the non-detection count nD is incremented only by 1 (nD=1), the operation proceeds to a detection process for the next detection window.

Since the watermark is not detected even in detection windows 4 and 5, the non-detection count nD is incremented, as similar to the above.

Next, the time code information "t2" is detected in a detection window 6, so that the non-detection count nD is set to 0, and the time code information is updated (TCprev=t1, TCcur=t2). When each detection window is determined, attack (a combination of "No Attack", "Addition", and "Deletion" which respectively shows no attack, an illegally added part, and an illegally deleted part) against each detection window can be determined using three kinds of parameter information stored in the detected-information storage buffer 343. On determination, attack against each detection window is determined in accordance with an Attack determination reference as shown in FIG. 10. In the case where a determination result in a detection window shows Addition, a difference between TCprev and TCcur is calculated in the next window (the detection window 6 in the drawing). If the difference is two units of time or larger, the determination of the previous detection window is changed from Addition to Replacement.

In the detection process, the time code information is detected from each detection window composed of a predetermined number of continuous frame data. However, the electronic watermark of the additional information such as an ID and GPS is detected from each detection window in some cases along with the detection process. In this case, the number of frames configuring a target detection window of the time code information and the number of frames configuring a target detection window of the additional information are not necessarily the same, but may be different. Specifically, detection timing of the time code information may different from that of the additional information, and the number of frames necessary for detection at a time may be different.

Next, a detection process of a watermark in the case where video content is illegally deleted will be described with reference to FIG. 8.

This example is an example in which a segment into which the time code information t3 is embedded and parts of segments into which t2 and t4 are embedded are illegally deleted.

By a process similar to that of FIG. 7, the parameters in the detected-information storage buffer 343 are initialized first, and a frame accumulation process in which frames are added pixel-by-pixel is performed for the frame images (detection window) composed of N/2 frames in the detection window. Then, a watermark is detected from one added-watermark-information generated.

Figure 8:
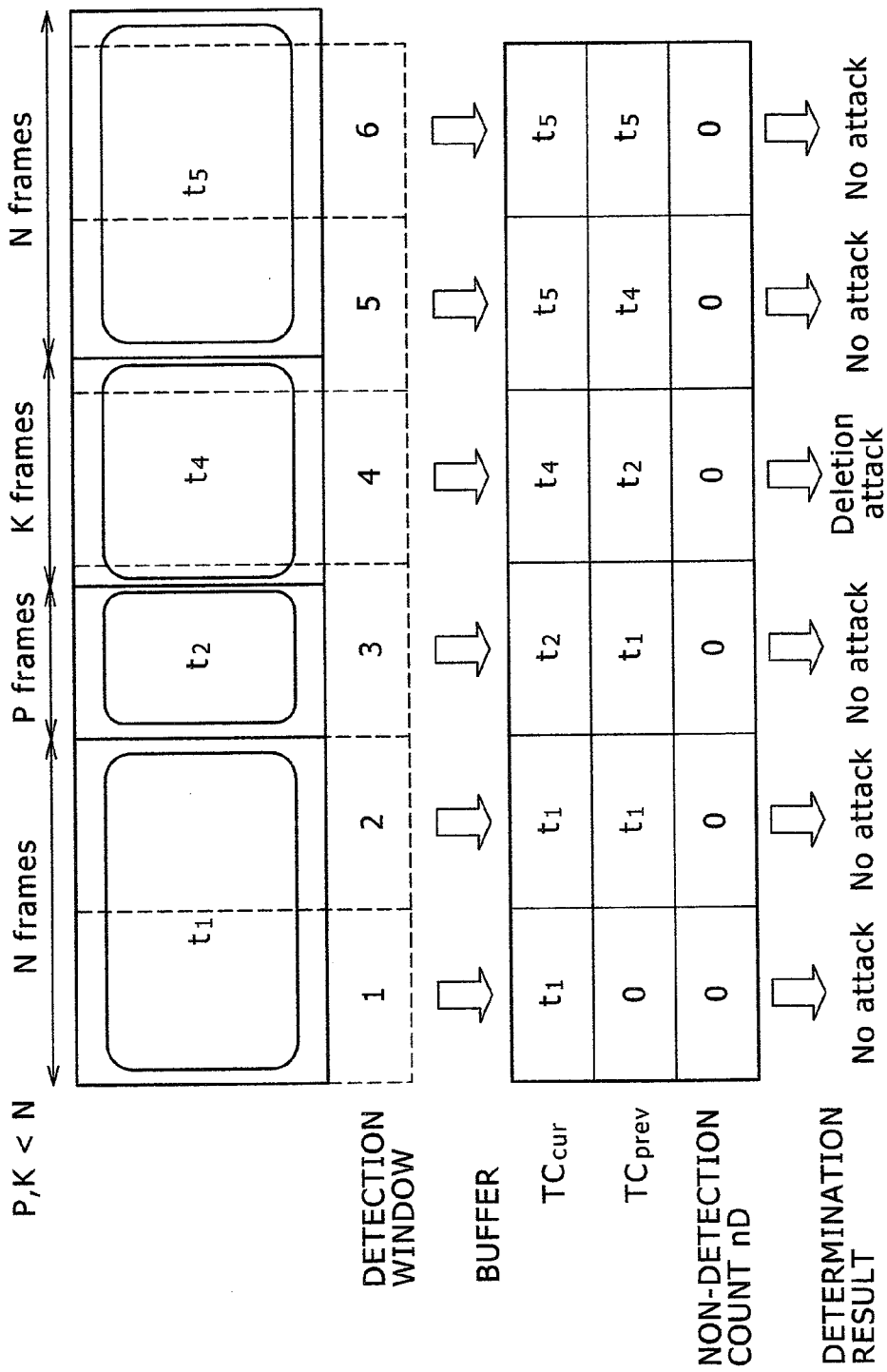
FIG. 8 is a diagram schematically showing a detection process of an electronic watermark when content is illegally deleted.

The detection windows 1, 2, and 3 shown in FIG. 8 are determined as No Attack in accordance with the Attack determination reference shown in FIG. 10. However, t2 and t4 are set to TCprev and TCcur, respectively in the detection window 4, so that this detection area is determined as Deletion in accordance with the Attack determination reference. As in this example, delay occurs at the position where frames are actually deleted and the position of the detection window determined as Deletion in some cases. However, by checking around the determination position, an illegally-deleted position can be reliably detected.

Next, a detection process of an electronic watermark in the case where content is illegally replaced will be described with reference to FIG. 9.

This example is an example in which a segment into which the time code information t2 is embedded and a part of a segment into which t2 is embedded are illegally replaced by another piece of content. By a process similar to that of FIG. 7, the parameters in the detected-information storage buffer 343 are initialized first, and a frame accumulation process in which frames are added pixel-by-pixel is performed for the frame images (detection window) composed of N/2 frames in the detection window. Then, a watermark is detected from one added-watermark-information generated.

Figure 9:
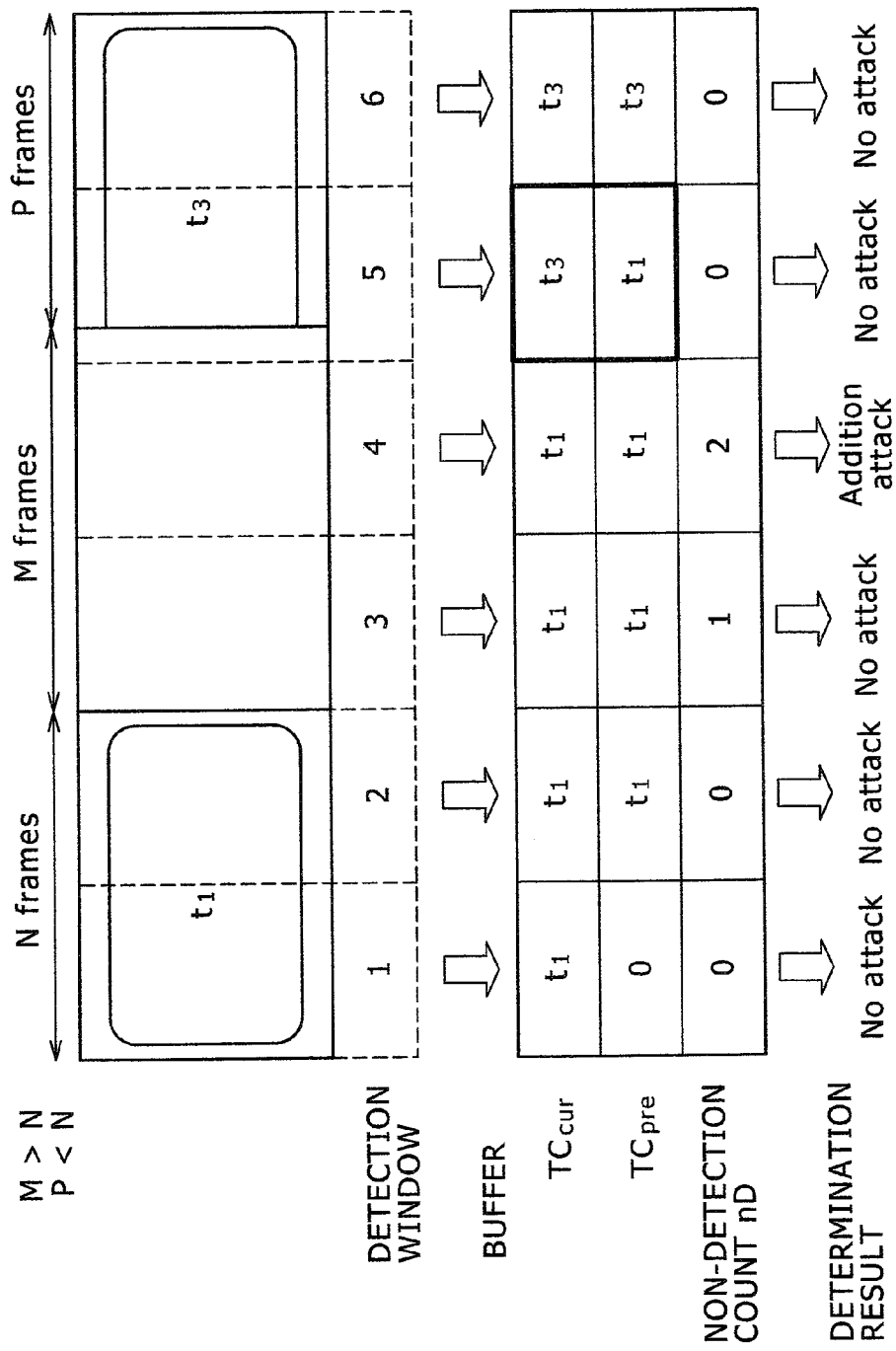
FIG. 9 is a diagram schematically showing a detection process of an electronic watermark when content is illegally replaced.

The detection windows 1, 2, and 3 shown in FIG. 9 are determined as No Attack in accordance with the Attack determination reference shown in FIG. 10. However, 2 is set to the non-detection count nD in the detection window 4, so that this detection area is tentatively determined as Addition in accordance with the Attack determination reference. In the detection window 5 next to the detection window 4, a difference between TCprev and TCcur is calculated because the determination result shows Addition in the detection window 4. If the difference is two units of time or larger, the determination of the previous detection window is changed from Addition to Replacement.

Figure 11:
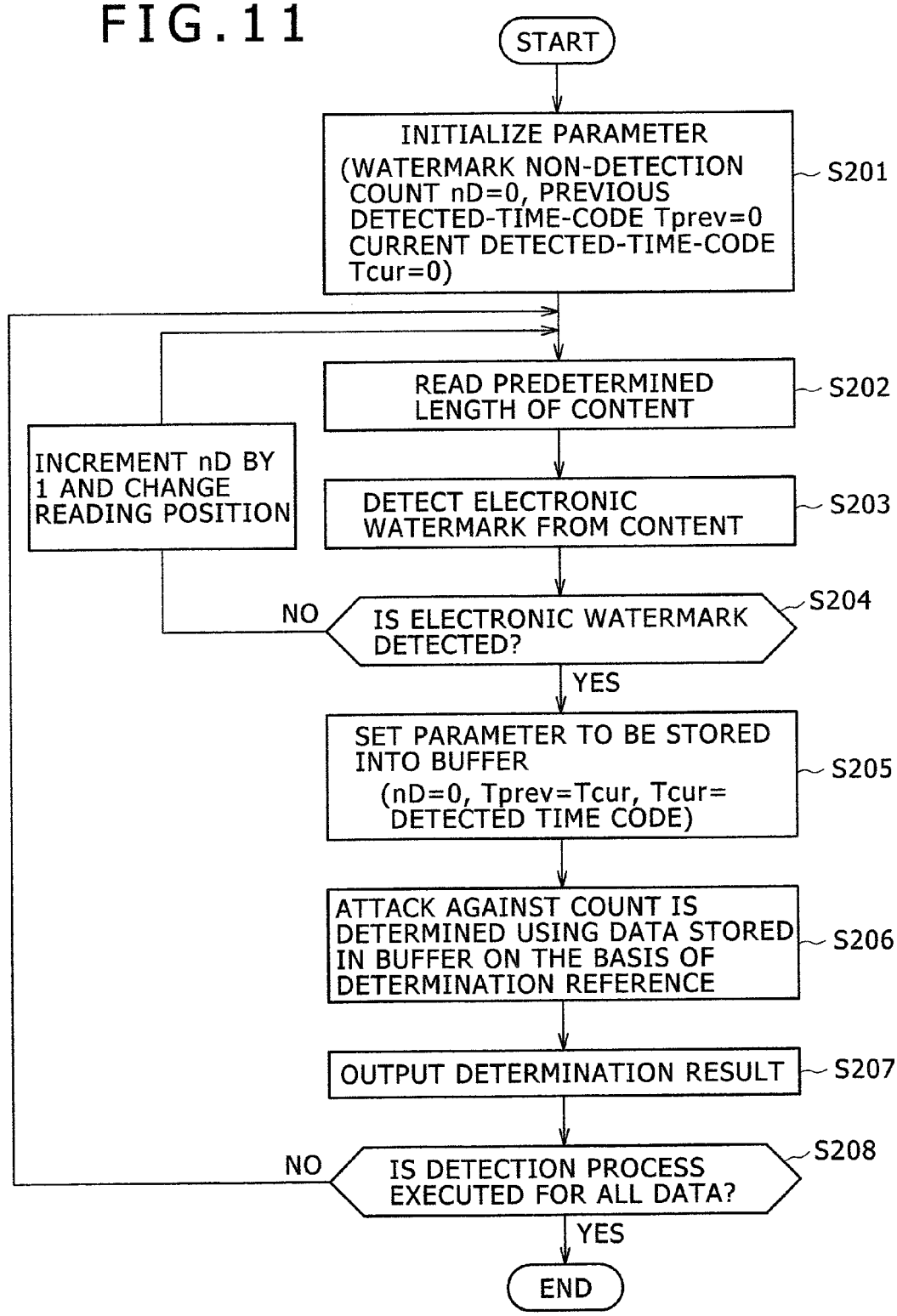
FIG. 11 is a flowchart showing an example of an operation of an electronic watermark detecting process in the electronic watermark detecting apparatus.

Next, a processing operation of detecting an electronic watermark in the electronic watermark detecting apparatus 34 will be described with reference to a flowchart shown in FIG. 11.

In the case where the video content with the electronic watermark embedded is obtained through the communication network 11 from the electronic watermark detecting apparatus 34, the content storage/distribution server 12, or the content processing apparatus 20, the electronic watermark detecting apparatus 34 starts a processing operation of detecting an electronic watermark.

First, the detected-information storage buffer 343 initializes relevant parameters (S201). Specifically, the time code information (TCcur) detected from a target detection window, the time code information (TCprev) detected from the previous detection window of the target detection window, and the watermark non-detection count (nD) are all set to 0. Next, the content obtaining unit 341 reads a predetermined number of frames stored in a storage area of the electronic watermark detecting apparatus 34 through the communication network 11 from the content storage/distribution server 12 or the content processing apparatus 20 (S202).

Next, the watermark information detecting unit 342 divides the read video content into sub-segments, each composed of continuous N/2 frames, sets the detection windows to the sub-segments with the process shown in FIG. 7, and then detects the electronic watermark (S203). Then, it is determined whether or not the electronic watermark is detected from the detection window (S204).

In the case where the determination result shows that the electronic watermark is not detected, the watermark non-detection count nD is incremented only by 1, and then a position where the content is read is set to that for the adjacent sub-segment. Thereafter, the operation proceeds to the process of 5202, and then a detection process of the next detection window is started.

On the other hand, in the case where the electronic watermark is detected in 5204, the parameters in the detected-information storage buffer 343 are set (S205). Specifically, the watermark non-detection count nD is set to 0, and the time code information (TCcur and TCprev) is updated.

Next, the parameters in the detected-information storage buffer 343 are read, and with reference to the Attack determination reference as shown in FIG. 10, the Attack determination is performed in the detection window corresponding to the determination reference (S206). Thereafter, the determination result of the detection window is output (S207).

Then, it is determined whether or not the watermark detection process is performed for all of the sub-segments (S208). If the process is not performed, the detection process is started in 5202 for a sub-segment for which the detection process is not performed. On the other hand, if the detection process is performed, the process of the electronic watermark detecting apparatus 34 is terminated. It should be noted that the respective processes of the steps can be realized by allowing a computer configuring the electronic watermark detecting apparatus 34 to execute programs that perform these processes.

Followings are application examples of the technique for detecting falsification such as deletion, addition, and replacement of digital video content using the time-code electronic watermark according to the above-described embodiment.

As an example, the embodiment can be applied to a case in which video of constructions such as buildings and roads are kept. The following acts possibly occur: video of an already-constructed building is falsified to be added to or replace that of a target building which is still under construction. However, as in the embodiment, the presence or absence of detection of the time codes embedded through the electronic watermark can detect such illegal acts.

Further, as another example, application to medical practice is conceivable. For example, video shooting a surgery is kept while embedding the time codes thereinto through the electronic watermark. In the case where a mistake in the surgery is found out later, if the video of the part of the mistake is deleted, illegal falsification of the video can be detected by detecting the time codes.

Furthermore, as still another example, the embodiment can be applied to detection of video falsification by police insiders. For example, video shooting a scene of regulating or chasing violators by police is kept while embedding the time codes thereinto through the electronic watermark. If a police insider falsifies the video shooting an accident scene of the violator, illegal deletion or falsification can be detected by detecting the time codes embedded into the video.

What is claimed is:

1. An electronic watermark detecting apparatus which detects an electronic watermark from video content which includes a plurality of segments configuring continuous predetermined N pieces of frame data, and which the same electronic watermark is embedded into each of the N pieces of frame data configuring the segment, the apparatus comprising:
   a unit divides the video content into a plurality of sub-segments, each sub-segment being composed of continuous N/2 pieces of frame data;
   a detecting unit which detects regularity information embedded preliminarily through the electronic watermark from the sub-segments;
   a unit which calculates a non-detection count in the case the electronic watermark is not detected from the sub-segment and which resets the non-detection count to zero when the electronic watermark is detected;
   a unit which calculates a difference value between the regularity information detected from a previous sub-segment and the regularity information detected from a current sub-segment;
   a unit which determines falsification of the sub-segment on the basis of the difference value and the non-detection count; and
   wherein the regularity information is embedded into a first predetermined number of pieces of continuous frame data through the electronic watermark, additional information is further embedded into a second predetermined number of pieces of continuous frame data through the electronic watermark, and the detecting unit detects the regularity information and the additional information.

2. The electronic watermark detecting apparatus according to claim 1,
   wherein the detecting unit detects ordered sequential information or time codes, all of which are embedded as the regularity information.

3. The electronic watermark detecting apparatus according to claim 1,
   wherein the detecting unit detects at least one of identification information, positional information, and right information of the video content, all of which are preliminarily embedded into the frame data as the additional information.

4. An electronic watermark detecting method which detects an electronic watermark which includes a plurality of segments configuring continuous predetermined N pieces of frame data, and in which the same electronic watermark is embedded into each of the N pieces of frame data configuring the segment, the method comprising:
   dividing the video content into a plurality of sub-segments, each sub-segment being composed of continuous N/2 pieces of frame data;
   detecting regularity information embedded preliminarily through the electronic watermark from the sub-segments;
   calculating a non-detection count in the case where the electronic watermark is not detected consecutively from the sub-segment and resetting the non-detection count to zero when the electronic watermark is detected;
   calculating a difference value between the regularity information detected from a previous sub-segment and the regularity information detected from a current sub-segment;
   determining falsification of the sub-segment on the basis of the difference value and the non-detection count; and
   wherein the regularity information embedded into a first predetermined number of pieces of continuous frame data through the electronic watermark and additional information embedded into a second predetermined number of pieces of continuous frame data through the electronic watermark, are detected through the electronic watermark.

5. The electronic watermark detecting method according to claim 4,
   wherein ordered sequential information or time codes, all of which are embedded as the regularity information, is detected.

6. The electronic watermark detecting method according to claim 4,
   wherein deletion, addition, or replacement of the video content is detected by detecting the electronic watermark including the regularity information.

7. The electronic watermark detecting method according to claim 4,
   wherein after a predetermined number N of obtained frames of video content are divided into sub-segments, each composed of continuous N/2 frames, detection windows are set to the sub-segments to detect the electronic watermark, and it is determined whether or not the electronic watermark is detected from the detection window, and a reading position of the video control is set to another reading position of adjacent sub-segment to proceed to a detection process in the next detection window,
   in the case where the determination result shows that the electronic watermark is not detected, a watermark non-detection count nD is incremented only by 1, and
   in the case where the determination result shows that the electronic watermark is detected, the watermark non-detection count nD is set to 0, and the regularity information is updated.

8. The electronic watermark detecting method according to claim 4,
   wherein at least one of identification information, positional information, and right information of the video content, all of which are preliminarily embedded into the frame data as the additional information, is detected.

9. A integrity verification system of video content, the system comprising:
   a content processing apparatus which processes video content which includes a plurality of segments configuring continuous predetermined N pieces of frame data, and in which the same electronic watermark is embedded into each of the N pieces of frame data configuring the segment; and
   a content verification apparatus which is coupled to the content processing apparatus through a network and detects falsification of the video content, wherein
   the content processing apparatus includes a unit which divides the video content into a plurality of sub-segments, each sub-segment being composed of continuous N/2 pieces of frame data, a unit which obtains regularity information from outside or inside, and a unit which embeds the obtained regularity information into the sub-segments,
   the content verification apparatus includes a detecting unit which detects the regularity information from the predetermined number of pieces of continuous frame data of the video content through the electronic watermark, a unit which calculates a non-detection count in the case the electronic watermark is not detected from the sub-segment and which resets the non-detection count to zero when the electronic watermark is detected, and a unit which calculates a difference value between the regularity information detected from a previous sub-segment and the regularity information detected from a current sub-segment and a unit which determines falsification of the sub-segment on the basis of the difference value and the non-detection count, and wherein the embedding unit embeds the regularity information into a first predetermined number of pieces of continuous frame data through the electronic watermark, and further embeds additional information into a second predetermined number of pieces of continuous frame data through the electronic watermark.

10. The integrity verification system according to claim 9, wherein the embedding unit embeds ordered sequential information or time codes as the regularity information, and the detecting unit detects the sequential information or the time codes.

11. The integrity verification system according to claim 9, wherein the embedding unit embeds at least one of identification information, positional information, and right information of the video content as the additional information, and the detecting unit detects at least one of the identification information, the positional information, and the right information of the video content embedded as the additional information.

* * * * *